US010298624B2

(12) United States Patent
Al-Damluji et al.

(10) Patent No.: US 10,298,624 B2

(45) **Date of Patent: *May 21, 2019**

(54) OPERATING A NETWORK NODE

(71) Applicant: METASWITCH NETWORKS LTD., Enfield (GB)

(72) Inventors: Salem Amin Al-Damluji, Enfield (GB); George Malcolm Gilbert, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,393

(22) Filed: Aug. 21, 2017

(65) Prior Publication Data

US 2018/0103071 A1 Apr. 12, 2018

Related U.S. Application Data

(63) Continuation of application No. 15/439,556, filed on Feb. 22, 2017, now Pat. No. 9,807,126.

(30) Foreign Application Priority Data

Oct. 12, 2016 (GB) .................................. 1617323.9

(51) Int. Cl.

*H04L 29/06* (2006.01)

*G06F 15/16* (2006.01)

(52) U.S. Cl.

CPC ........ *H04L 65/1006* (2013.01); *H04L 65/105* (2013.01); *H04L 69/03* (2013.01)

(58) Field of Classification Search

CPC ........................... H04L 65/1006; H04L 69/03

See application file for complete search history.

(56) References Cited

U.S. PATENT DOCUMENTS

| | | | | |
|---|---|---|---|---|
| 7,885,266 | B2 | 2/2011 | Rengaraju et al. | |
| 2003/0149775 | A1 * | 8/2003 | O'Neill .................. | H04L 29/06 709/227 |

(Continued)

FOREIGN PATENT DOCUMENTS

| | | | |
|---|---|---|---|
| WO | 2009089904 | A1 | 7/2009 |
| WO | 2016134249 | A1 | 8/2016 |

OTHER PUBLICATIONS

3GPP TR 29.962 V6.1.1 3rd Generation Partnership Project; Technical Specification Group Core Network Signalling interworking between the 3GPP profile of the Session Initiation Protocol (SIP) and non-3GPP SIP usage (Release 6); (http://www.arib.or.jp/IMT-2000/V900Jul11/5_Appendix/Rel6/29/29962-611.pdf).

(Continued)

*Primary Examiner* — Viet D Vu

(74) *Attorney, Agent, or Firm* — EIP US LLP

(57) ABSTRACT

Measures, including methods, apparatus and computer programs, for use in operating a network node. A method includes, at the network node: receiving a session initiation protocol (SIP) message directed towards a downstream network element, wherein the received message comprises session description protocol (SDP) data indicating a first SDP preconditions setting; forwarding the received SIP message on to the downstream network element with no modifications; in response to forwarding the received SIP message, receiving a rejection message from the downstream network element; on the basis of the received rejection message, determining that the first SDP preconditions setting is not supported by downstream device; generating a second SIP message comprising SDP data indicating a second SDP preconditions setting different from the first SDP preconditions setting; and transmitting the generated second SIP message comprising SDP data indicating the (Continued)

second SDP preconditions setting to the downstream network element.

5 Claims, 3 Drawing Sheets

(56) References Cited

U.S. PATENT DOCUMENTS

| | | | |
|---|---|---|---|
| 2004/0139088 | A1 | 7/2004 | Mandato |
| 2008/0270618 | A1 | 10/2008 | Rosenberg |
| 2010/0287285 | A1 | 11/2010 | Castellanos Zamora |
| 2011/0219134 | A1 | 9/2011 | Lidstrom et al. |
| 2013/0021998 | A1 | 1/2013 | Shatsky |
| 2014/0328217 | A1 | 11/2014 | Bollapragada et al. |
| 2016/0248814 | A1* | 8/2016 | Mufti .................. H04L 65/1006 |

OTHER PUBLICATIONS

GSMA IMS Profile for Voice and SMS Version 9.0, Apr. 8, 2015 (http://www.gsma.com/newsroom/wp-content/uploads/IR.92-v9.0.pdf).

Camarillo et al: Integration of Resource Management and Session Initiation Protocol (SIP); Network Working Group RFC 3112, Oct. 2002. (https://tools.ietf.org/html/rfc3312).

Camarillo et al: Update to the Session Initiation Protocol (SIP) Preconditions Framework; Network Working Group RFC 4032, Mar. 2005. (https://tools.ietf.org/html/rfc4032).

Andreasen et al.: Connectivity Preconditions for Session Description Protocol (SDP) Media Streams; Internet Engineering Task Force RFC 5898, Jul. 2010 (https://tools.ietf.org/html/rfc5898).

* cited by examiner

OPERATING A NETWORK NODE

CROSS REFERENCE TO RELATED APPLICATION

This application is a continuation of U.S. application Ser. No. 15/439,556, filed Feb. 22, 2017, which claims priority under 35 U.S.C. § 119(a) to UK patent application no. GB1617323.9, filed on 12 Oct. 2016. Each of the above-referenced patent applications is incorporated by reference in its entirety.

TECHNICAL FIELD

The present disclosure relates to operating a network node. In particular, but not exclusively, the present disclosure relates to operating a network node in relation to Session Description Protocol (SDP) preconditions.

BACKGROUND

As part of the Session Initiation Protocol (SIP) message flow to set up a call (or 'communication session'), an end-point can optionally include SDP data to suggest the media to use (for example choice of codec). That SDP data can also contain one or more "preconditions" on the media (for example reservation of resources and/or securing a minimum Quality of Service (QoS)).

The Voice over Long Term Evolution (VoLTE) specifications mandate that phones use SIP preconditions, and that legacy equipment should be backwards compatible with receiving SIP preconditions. However, some legacy equipment is not backwards compatible. To ensure that calls do not fail, 3rd Generation Partnership Project (3GPP) specifications therefore allow networks to mandate either that all incoming SIP INVITE messages must contain preconditions, and reject any that do not with a SIP error code indicating such, or that all incoming SIP INVITE messages must not contain pre-conditions, and reject any that do with a SIP error code indicating such.

A network operator can choose which behavior they want to match the behavior of their back-end equipment.

For any given SIP INVITE message, intermediate network elements may or may not receive preconditions, and may or may not need to send preconditions. Hardcoded configuration, for example always send preconditions or always do not send preconditions, will only work in some scenarios, for example where all downstream endpoints on a given adjacency have the same behavior, and not the general case.

SUMMARY

According to embodiments of the present disclosure, there is a method of operating a network node. The method includes, at the network node: receiving a session initiation protocol (SIP) message directed towards a downstream network element, wherein the received message comprises session description protocol (SDP) data indicating a first SDP preconditions setting. The method includes, at the network node: forwarding the received SIP message on to the downstream network element with no modifications. The method includes, at the network node: in response to forwarding the received SIP message, receiving a rejection message from the downstream network element. The method includes, at the network node: on the basis of the received rejection message, determining that the first SDP preconditions setting is not supported by downstream device. The method includes, at the network node: generating a second SIP message comprising SDP data indicating a second SDP preconditions setting different from the first SDP preconditions setting. The method includes, at the network node: transmitting the generated second SIP message comprising SDP data indicating the second SDP preconditions setting to the downstream network element.

According to embodiments of the present disclosure, there is apparatus for use in operating a network node, the apparatus comprising at least one memory including computer program code, and at least one processor in data communication with the at least one memory, wherein the at least one processor is configured to, at the network node: receive a session initiation protocol (SIP) message directed towards a downstream network element, wherein the received message comprises session description protocol (SDP) data indicating a first SDP preconditions setting. The at least one processor is configured to, at the network node: The at least one processor is configured to, at the network node: forward the received SIP message on to the downstream network element with no modifications. The at least one processor is configured to, at the network node: in response to forwarding the received SIP message, receive a rejection message from the downstream network element. The at least one processor is configured to, at the network node: on the basis of the received rejection message, determine that the first SDP preconditions setting is not supported by downstream device. The at least one processor is configured to, at the network node: generate a second SIP message comprising SDP data indicating a second SDP preconditions setting different from the first SDP preconditions setting. The at least one processor is configured to, at the network node: transmit the generated second SIP message comprising SDP data indicating the second SDP preconditions setting to the downstream network element.

According to embodiments of the present disclosure, there is a non-transitory computer-readable storage medium comprising computer-executable instructions which, when executed by a processor, cause a computing device to perform a method of operating a network node, the method includes, at the network node: receiving a session initiation protocol (SIP) message directed towards a downstream network element, wherein the received message comprises session description protocol (SDP) data indicating a first SDP preconditions setting. The method includes, at the network node: forwarding the received SIP message on to the downstream network element with no modifications. The method includes, at the network node: in response to forwarding the received SIP message, receiving a rejection message from the downstream network element. The method includes, at the network node: on the basis of the received rejection message, determining that the first SDP preconditions setting is not supported by downstream device. The method includes, at the network node: generating a second SIP message comprising SDP data indicating a second SDP preconditions setting different from the first SDP preconditions setting. The method includes, at the network node: transmitting the generated second SIP message comprising SDP data indicating the second SDP preconditions setting to the downstream network element.

According to embodiments of the present disclosure, there is method of providing session description protocol (SDP) preconditions interworking. The method includes, at an SDP preconditions interworking node: receiving a session initiation protocol (SIP) message directed towards a downstream network element, wherein the received message comprises session description protocol (SDP) data. The method includes, at an SDP preconditions interworking node: forwarding the received SIP message on to the downstream network element with no modifications. The method includes, at an SDP preconditions interworking node: in response to forwarding the received SIP message, receiving a rejection message from the downstream network element. The method includes, at an SDP preconditions interworking node: in response to the received rejection message indicating that the rejection message was transmitted due to the forwarded SIP message comprising no SDP preconditions, generating a second SIP message comprising one or more SDP preconditions and transmitting the generated second SIP message to the downstream network element. The method includes, at an SDP preconditions interworking node: in response to the received rejection message indicating that the rejection message was transmitted due to the forwarded SIP message comprising one or more SDP preconditions, generating a third SIP message comprising no SDP preconditions and transmitting the generated third SIP message to the downstream network element.

According to embodiments of the present disclosure, there is an apparatus for use in providing session description protocol (SDP) preconditions interworking. The apparatus includes: at least one memory including computer program code. The apparatus includes: at least one processor in data communication with the at least one memory, wherein the at least one processor is configured to, at an SDP preconditions interworking node: receive a session initiation protocol (SIP) message directed towards a downstream network element, wherein the received message comprises session description protocol (SDP) data. The at least one processor is configured to, at an SDP preconditions interworking node: forward the received SIP message on to the downstream network element with no modifications. The at least one processor is configured to, at an SDP preconditions interworking node: in response to forwarding the received SIP message, receive a rejection message from the downstream network element. The at least one processor is configured to, at an SDP preconditions interworking node: in response to the received rejection message indicating that the rejection message was transmitted due to the forwarded SIP message comprising no SDP preconditions, generate a second SIP message comprising one or more SDP preconditions and transmit the generated second SIP message to the downstream network element. The at least one processor is configured to, at an SDP preconditions interworking node: in response to the received rejection message indicating that the rejection message was transmitted due to the forwarded SIP message comprising one or more SDP preconditions, generate a third SIP message comprising no SDP preconditions and transmit the generated third SIP message to the downstream network element.

According to embodiments of the present disclosure, there is a non-transitory computer-readable storage medium comprising computer-executable instructions which, when executed by a processor, cause a computerised device to perform a method of operating a network node. The method includes, at the network node: receiving a session initiation protocol (SIP) message directed towards a downstream network element, wherein the received message comprises session description protocol (SDP) data. The method includes, at the network node: The method includes, at the network node: forwarding the received SIP message on to the downstream network element with no modifications. The method includes, at the network node: in response to forwarding the received SIP message, receiving a rejection message from the downstream network element. The method includes, at the network node: in response to the received rejection message indicating that the rejection message was transmitted due to the forwarded SIP message comprising no SDP preconditions, generating a second SIP message comprising one or more SDP preconditions and transmitting the generated second SIP message to the downstream network element. The method includes, at the network node: in response to the received rejection message indicating that the rejection message was transmitted due to the forwarded SIP message comprising one or more SDP preconditions, generating a third SIP message comprising no SDP preconditions and transmitting the generated third SIP message to the downstream network element.

Further features of the present disclosure will become apparent from the following description of preferred embodiments, given by way of example only, which is made with reference to the accompanying drawings.

DETAILED DESCRIPTION

Figure 1:
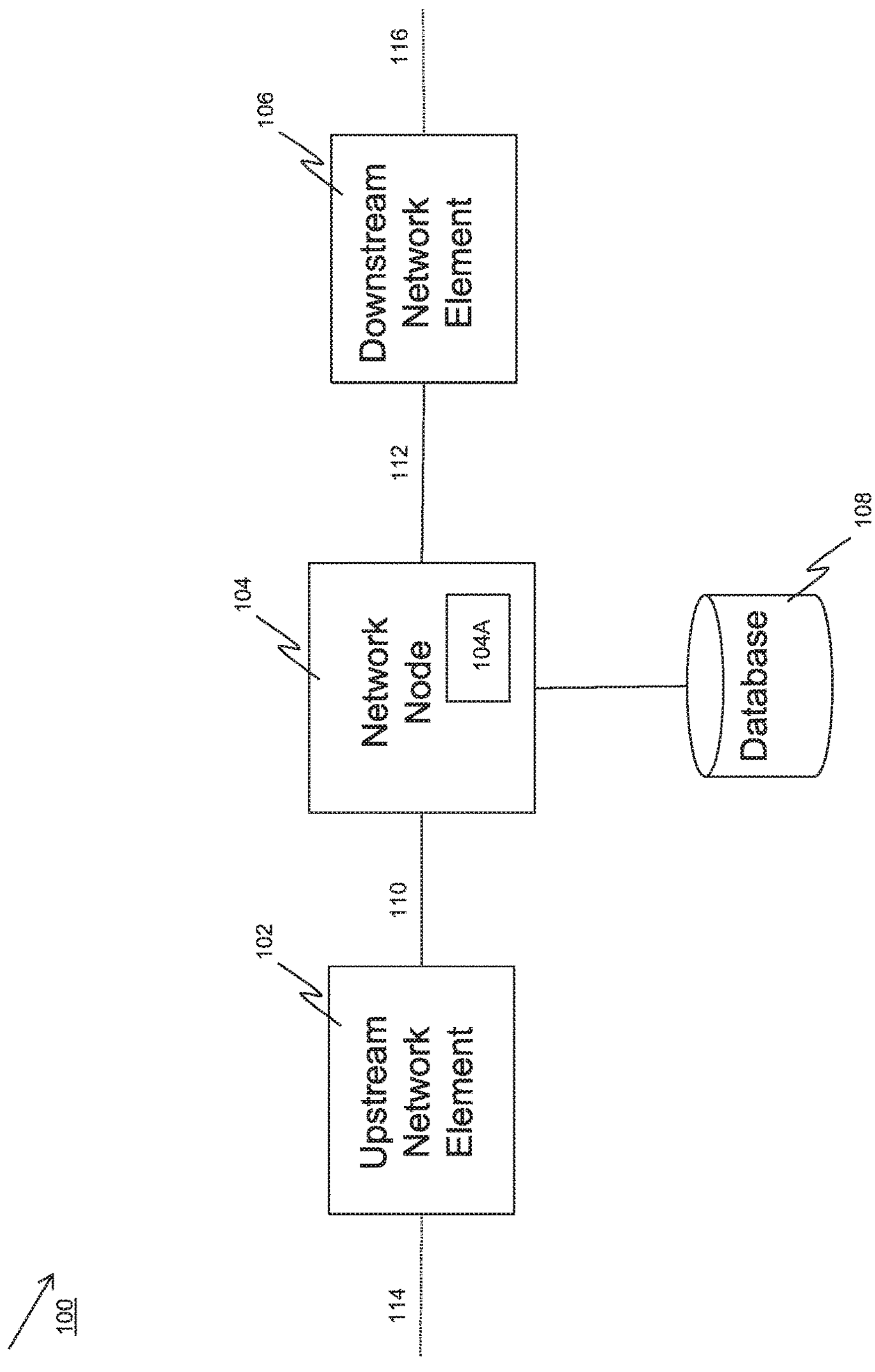
FIG. 1 shows a system diagram according to embodiments.

FIG. 1 shows a system diagram of a network 100 according to embodiments. Network 100 comprises a network node 104, an upstream network element 102 and a downstream network element 106. Network 100 may for example comprise one or more packet-switched and/or one or more circuit-switched networks, for example an Internet Protocol (IP) network such as the internet, an IP Multimedia Subsystem (IMS) network, a 3GPP network, etc.

Network node 104 comprises one or more processors 104A for performing various data processing operations according to embodiments. Network node 104 has access to a database 108 for storing various data according to embodiments. Database 108 may comprise one or more memories and may be integral to or external to network node 104. Database 108 may comprise memory within network node 104 which is available for storing state data for communication sessions processed by network node 104; the memory may be volatile so that data stored therein may need to be re-learnt upon failure/re-boot of network node 104.

Network node 104 may comprise one or more of a session border controller, a media gateway, a softswitch, a proxy call session control function (a P-CSCF from an IMS network), and a server. Network node 104 is able to communicate with other network elements in network 100 such as upstream network element 102 via connection 110, downstream network element 106 via connection 112, and one or more other network elements (not shown). Network node 104 may for example be logically located on the border between two networks, for example a 3GPP network (where upstream network element 102 may for example be located) and an IMS network (where downstream network element 106 may for example be located).

Upstream network element 102 is logically adjacent to network node 104 in network 100 and also possibly to one or more further upstream network elements (not shown) via connection(s) 114. Upstream network element 102 may comprise a network node or an endpoint device. Upstream network element 102 may comprise one or more processors and/or one or more memories (not shown) for performing various data processing and data storage tasks respectively.

Downstream network element 106 is logically adjacent to network node 104 in network 100 and also possibly to one or more further downstream network elements (not shown) via connection(s) 116. Downstream network element 106 may comprise a network node or an endpoint device. Downstream network element 106 may comprise one or more processors and/or one or more memories (not shown) for performing various data storage processing and data storage tasks respectively. Downstream network element may comprise an intermediate network node connected between multiple other network nodes.

Embodiments of the present disclosure enable fully flexible interworking between different SDP precondition behavior types.

An SDP precondition is a condition that has to be satisfied for a given data stream (for example a media stream) in order for session establishment or modification to proceed. When the precondition is not met, session progress is delayed until the precondition is satisfied or the session establishment fails. For example, Internet Engineering Task Force (IETF) Request For Comments (RFC) 3312 defines a QoS precondition, which is used to ensure availability of network resources prior to establishing a session (i.e., prior to starting to alert the callee).

Embodiments provide interworking of SDP preconditions at one or more network nodes, such as network node 104 of FIG. 1. The network node of embodiments learns the SDP precondition preferences of adjacent and other network elements in the network and uses this learnt knowledge to provide improved processing of SDP precondition data, for example adjusting the presence or absence of SDP preconditions on SIP messages it sends. SDP precondition preferences may for example indicate whether a network element (or elements) requires, supports or forbids preconditions in the SDP.

Embodiments provide measures, including methods, apparatus, computer programs and computer program products, for use in operating a network node 104.

Figure 2:
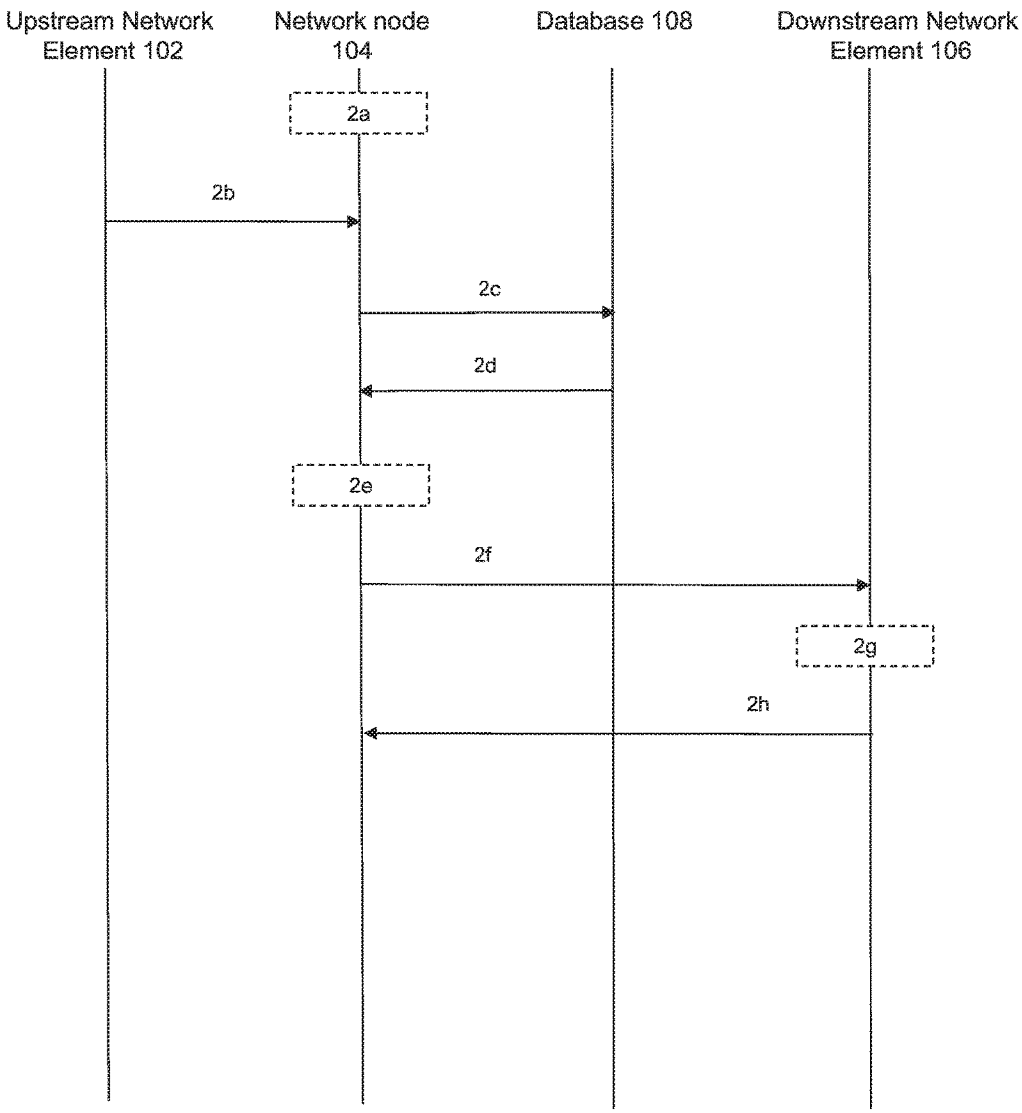
FIG. 2 shows a message flow diagram according to embodiments.

Embodiments of the present disclosure are now described in relation to FIG. 2. FIG. 2 shows a message flow diagram according to embodiments. As per item 2*a*, network node 104 maintains a database 108 of SDP precondition preference data for a plurality of network elements.

As per item 2*b*, network node 104 receives a SIP message directed towards a downstream network element 106. The term 'directed towards' here could for example mean that the message comprises a network address or other identifier for the downstream network element in question.

The SIP message received by network node 104 in item 2*b* comprises SDP data. In these embodiments, the SIP message of item 2*b* is transmitted to network node 104 from upstream network element 102.

The SIP message of item 2*b* may comprise a communication session (for example an audio or video call) setup request message such as a SIP INVITE message relating to setup of a new communication session. The SIP message of item 2*b* may comprise a call modification message such as a SIP UPDATE message relating to a change or modification to an existing communication session.

As per item 2*c*, network node 104 performs a lookup in database 108 in relation to the received SIP message to retrieve, as per item 2*d*, SDP precondition preference data for downstream network element 106.

Network node 104 processes, as per item 2*e*, the received SIP message according to the retrieved SDP precondition preference data. Network node 104 transmits, as per item 2*f*, the processed SIP message to downstream network element 106. Downstream network element 106 processes the received SIP message, as per item 2*g* and sends a response to network node 104 as per item 2*h*. The response of item 2*h* to network node 104 may be an accept message such as a SIP 183 or a SIP 200 OK message. Alternatively, the response of item 2*h* to network node 104 may be an error (or reject) message such as a SIP 421 message.

Due to the maintenance of database 108 and lookup/retrieval of SDP precondition preference data therefrom in relation to handling of SIP messages by network node 104, the likelihood of the message of item 2*h* being an accept message rather than an error message is higher than with known systems. Such learning of SDP precondition preferences of network elements in network 100 by network node 104, enables network node 104 to provide improved SDP precondition interworking. Embodiments described herein lead to a lower number of retries being transmitted before the SDP precondition requirements of a downstream network element are identified which leads to a lower level of network traffic in network 100 overall. Embodiments described herein mean that less processing resources at network nodes such as network node 104 are used up in handling SDP preconditions.

In some embodiments, the processing of the received SIP message by network node 104 comprises removing one or more SDP precondition parameters from the SDP data comprised in the received SIP message. In other embodiments, the processing of the received SIP message by network node 104 comprises inserting one or more SDP precondition parameters into the SDP data comprised in the received SIP message.

In some embodiments, the SDP data comprised in the received SIP message indicates one or more precondition parameters and the processing of the received SIP message by network node 104 comprises removing at least one of the one or more indicated precondition parameters. Such functionality may for example be employed if a lookup in database 108 by network node 104 indicates that downstream network element 106 to which the received SIP message is directed indicates that downstream network element 106 has a preference for receiving no SDP preconditions at all or a preference for fewer SDP preconditions than are contained in the received SIP message.

In some embodiments, the SDP data comprised in the received SIP message does not indicate any SDP precondition parameters and the processing comprises inserting one or more SDP precondition parameters. Such functionality may for example be employed if a lookup in database 108 by network node 104 indicates that downstream network element 106 to which the received SIP message is directed indicates that downstream network element 106 has a preference for receiving some SDP preconditions or a preference for more SDP preconditions than are contained in the received SIP message.

According to embodiments, network node 104 stores SDP precondition preference data for a plurality of network elements in database 108. The SDP precondition preference data can be dynamically updated by network node 104 according to various methods. In some embodiments, the SDP precondition preference data in database 108 is updated by one or more network nodes other than network node 104; in some such embodiments, database 108 can act as a shared store of SDP precondition preference data which is accessible for data additions/updates as well as data lookup/retrieval.

The maintaining of database 108 comprises updating SDP precondition preference data for network elements on the basis of events occurring during historical communication sessions involving those (or possibly other) network elements. The maintaining may for example comprise updating SDP precondition preference data for network elements on the basis of a weighted probability metric calculated from events occurring during historical communication sessions involving those network elements.

In some embodiments, the maintaining of database 108 comprises network node 104 receiving a first SIP message directed towards a first downstream network element. The first received SIP message comprises SDP data indicating one or more SDP precondition parameters. Network node 104 forwards the first SIP message unmodified to the first downstream network element. In response to receipt by network node 104 of an error message from the first downstream network element indicating that the one or more SDP precondition parameters indicated in the forwarded first SIP message are prohibited, network node 104 updates SDP precondition preference data for the first downstream network element in the database to indicate that the one or more SDP precondition parameters indicated in the forwarded first SIP message are prohibited.

Embodiments comprise, in response to receipt by network node 104 of an accept message from the first downstream network element indicating that the one or more SDP precondition parameters indicated in the forwarded first SIP message are supported or required, network node 104 updating SDP precondition preference data for the first downstream network element in the database to indicate that the one or more SDP precondition parameters indicated in the forwarded first SIP message are supported or required.

In some embodiments, the maintaining of database 108 comprises network node 104 receiving a second SIP message directed towards a second downstream network element. The second received SIP message comprises SDP data indicating no SDP precondition parameters. Network node 104 forwards the second SIP message unmodified to the second downstream network element. In response to receipt by network node 104 of an error message from the second downstream network element indicating that one or more SDP precondition parameters are required, network node 104 updates SDP precondition preference data for the second downstream network element in the database to indicate that one or more SDP precondition parameters are required.

Embodiments comprise, in response to receipt by network node 104 of an accept message from the second downstream network element indicating that no SDP precondition parameters are required, network node 104 updating SDP precondition preference data for the second downstream network element in the database to indicate that no SDP precondition parameters are required.

In some scenarios, database 108 does not comprise any SDP precondition preference data for downstream network element 106 (for example because no previous or recent communication with downstream network element 106 has taken place). In some such embodiments, the processing of a SIP message comprising SDP data received by network node comprises processing the received SIP message according to a default SDP precondition preference modification.

In some embodiments, the SDP data comprised in the received SIP message indicates one or more SDP precondition parameters and the default SDP precondition preference processing comprises leaving the one or more indicated SDP precondition parameters unchanged. In other embodiments, the SDP data comprised in the received SIP message does not indicate any SDP precondition parameters and the processing comprises not inserting one or more SDP precondition parameters.

Embodiments comprise further processing the received SIP message on the basis of one or more parameters associated with one or more upstream network elements before the transmittal of the processed SIP message to the downstream network element. In some such embodiments, the one or more upstream network elements comprise upstream network element 102 from which the SIP message was received.

The one or more upstream network elements may comprise an endpoint device and the one or more parameters associated with the endpoint device comprise an identifier for the endpoint device or an identifier for a user of the endpoint device.

In embodiments, SDP precondition preference data maintained in the database comprises an indication that the given network element requires indication of one or more SDP precondition parameters. In embodiments, SDP precondition preference data maintained in the database comprises an indication that the given network element supports indication of one or more SDP precondition parameters. In embodiments, SDP precondition preference data maintained in the database comprises an indication that the given network element prohibits indication of any SDP precondition parameters, In embodiments, SDP precondition preference data maintained in the database comprises an indication that one or more further network elements downstream of the given network element require indication of one or more SDP precondition parameters. In embodiments, SDP precondition preference data maintained in the database comprises an indication that one or more further network elements downstream of the given network element support indication of one or more SDP precondition parameters. In embodiments, SDP precondition preference data maintained in the database comprises an indication that one or more further network elements downstream of the given network element prohibit indication of any SDP precondition parameters.

In embodiments, SDP precondition preference data maintained in the database comprises an indication that a network part in which the given network element is located requires indication of one or more SDP precondition parameters. In embodiments, SDP precondition preference data maintained in the database comprises an indication that a network part in which the given network element is located supports indication of one or more SDP precondition parameters. In embodiments, SDP precondition preference data maintained in the database comprises an indication that a network part in which the given network element is located prohibits indication of any SDP precondition parameters.

In embodiments, SDP precondition preference data maintained in the database comprises an indication that the hardware type of the given network element requires indication of one or more SDP precondition parameters. In embodiments, SDP precondition preference data maintained in the database comprises an indication that the hardware type of the given network element supports indication of one or more SDP precondition parameters. In embodiments, SDP precondition preference data maintained in the database comprises an indication that the hardware type of the given network element prohibits indication of any SDP precondition parameters.

In embodiments, SDP precondition preference data maintained in the database comprises an indication that a provider responsible for operating the given network element requires indication of one or more SDP precondition parameters. In embodiments, SDP precondition preference data maintained in the database comprises an indication that a provider responsible for operating the given network element supports indication of one or more SDP precondition parameters. In embodiments, SDP precondition preference data maintained in the database comprises an indication that a provider responsible for operating the given network element prohibits indication of any SDP precondition parameters.

In embodiments, SDP precondition preference data maintained in the database comprises an indication that a regulatory condition requires indication of one or more SDP precondition parameters. In embodiments, SDP precondition preference data maintained in the database comprises an indication that a regulatory condition prohibits indication of any SDP precondition parameters.

In some embodiments described above, SDP precondition preference data is associated with a given network element which is adjacent to network node 104. In other embodiments, SDP precondition preference data is associated with other network elements which are adjacent to network node 104 in addition to the given network element. Embodiments therefore allow SDP precondition preferences to be assessed at varying scopes, for example in relation to first and second network elements separately or first and second network elements together.

Embodiments provide measures, including methods, apparatus, computer programs and computer program products, for use in processing SIP messages at a network node.

Figure 3:
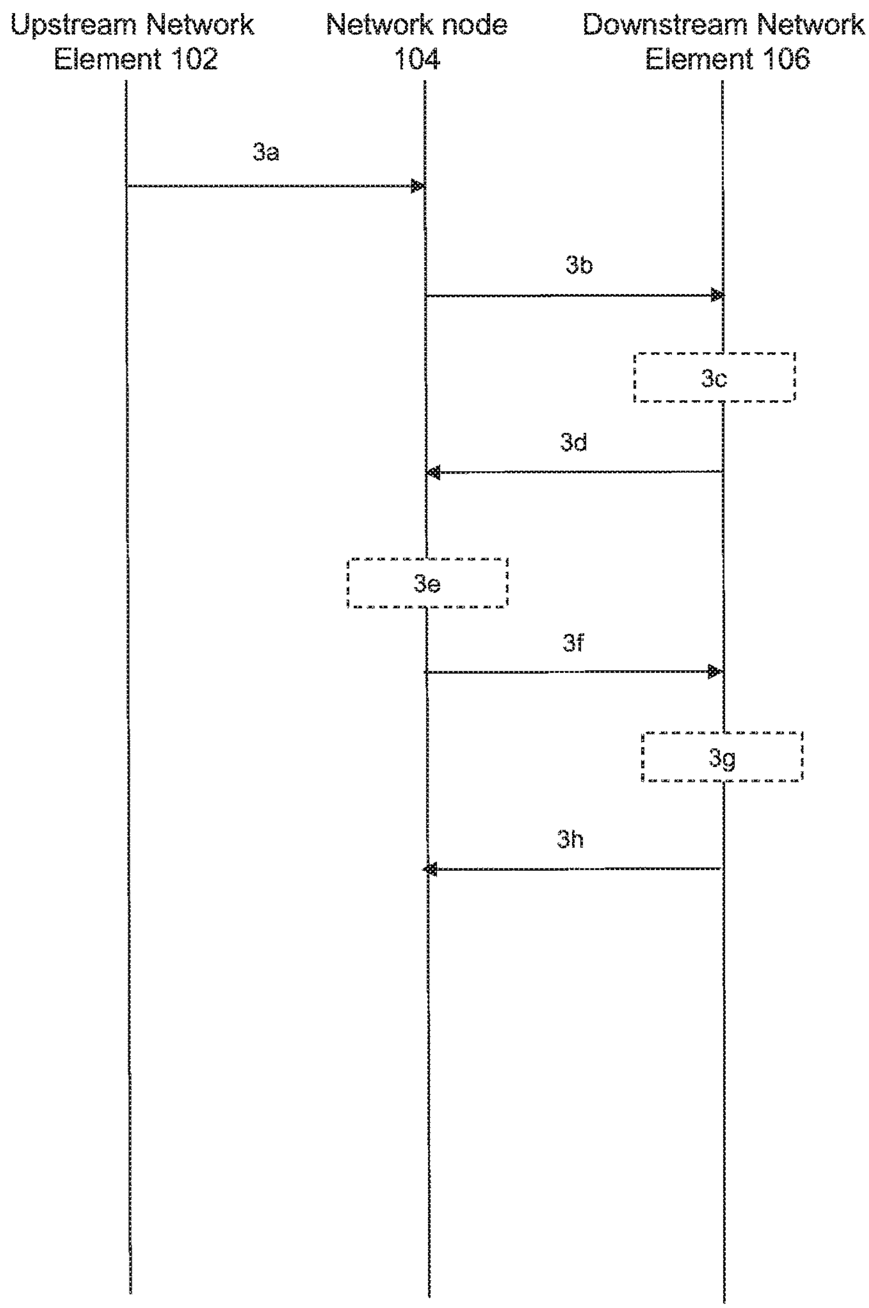
FIG. 3 shows a message flow diagram according to embodiments.

Embodiments of the present disclosure are now described in relation to FIG. 3. FIG. 3 shows a message flow diagram according to embodiments. As per item 3*a*, network node 104 receives a SIP message directed towards a downstream network element 106. The SIP message received by network node 104 in item 3*a* comprises SDP data indicating a first SDP preconditions setting. In these embodiments, the SIP message of item 3*a* is transmitted to network node 104 from upstream network element 102.

As per item 3*b*, network node 104 forwards the received SIP message on to downstream network element 106 with no modifications. When the SIP message of item 3*b* is received by downstream network element 106, downstream network element 106 processes the received SIP message as per item 3*c*.

In these embodiments, during processing of the SIP message of item 3*b* by downstream network element 106 as per item 3*c*, the first SDP preconditions setting indicated in the SDP data of the message causes the message to be rejected by downstream network element 106. Downstream network element therefore transmits a rejection message to network node 104 as per item 3*d*.

In response to forwarding the received SIP message, network node 104 thus receives a rejection message from downstream network element 106 as per item 3*d*.

On the basis of the received rejection message of item 3*d*, network node 104 determines that the first SDP preconditions setting is not supported by downstream device 106 and generates a second SIP message comprising SDP data indicating a second SDP preconditions setting different from the first SDP preconditions setting as per item 3*e*.

Network node 104 then transmits the generated second SIP message comprising SDP data indicating the second SDP preconditions setting to downstream network element 106 as per item 3*f*.

Downstream network element 106 then processes the received second SIP message, as per item 3*g* and sends a response to network node 104 as per item 3*h*. In these embodiments, the response message of item 3*h* comprises an accept message and network node 104 can conclude that the second SDP preconditions setting comprised in the SIP message of item 3*f* is supported by downstream network element 106. In embodiments, network node 104 updates database 108 with appropriate SDP precondition preference data for downstream network element 106.

In some embodiments, the first SDP preconditions setting comprises one or more SDP preconditions and the second SDP preconditions setting comprises no SDP preconditions. According to such embodiments, network node 104 learns that downstream network element 106 has an SDP preconditions preference for no SDP preconditions, so adjusts the SDP data in the second SIP message accordingly to have no SDP preconditions.

In other embodiments, the first SDP preconditions setting comprises no SDP preconditions and the second SDP preconditions setting comprises one or more SDP preconditions. According to such embodiments, network node 104 learns that downstream network element 106 has an SDP preconditions preference for one or more SDP preconditions, so adjusts the SDP data in the second SIP message accordingly to have one or more SDP preconditions.

In some embodiments described herein, network node 104 acts as a back-to-back user agent (B2BUA) in relation to a communication session comprising at least the received SIP message, i.e. network node acts as a SIP server to upstream network element 102 and a SIP client to downstream network element 106 and/or vice versa.

A worked example of SDP precondition interworking processing according to embodiments is now described as follows:

Upon boot-up or re-start, network node 104 passes through a SIP INVITE message it receives to downstream network element 106.

If the initial SIP INVITE message is rejected by downstream network element 106 with a reason of not having preconditions, then network node 104 learns that preconditions are required by downstream network element 106. Network node 104 then re-tries sending a SIP INVITE message to downstream network element 106 with preconditions.

If the initial SIP INVITE message is rejected by downstream network element 106 with a reason of having preconditions, then network node 104 learns that preconditions are prohibited by downstream network element 106. Network node 104 then re-tries sending a SIP INVITE message to downstream network element 106 without preconditions.

If the initial SIP INVITE message is accepted by downstream network element 106, then network node 104 learns that preconditions are supported, required or prohibited as appropriate depending on whether the initial SIP INVITE message contained preconditions or not. A network element accepting a message containing SDP preconditions does not in itself allow it to be concluded that the network element requires SDP preconditions, only that the network element at least supports SDP preconditions.

Thereafter, network node adjusts its behavior to either include or not include preconditions on subsequent SIP INVITE message. In embodiments, network node 104 adjusts its learning based on whether those SIP INVITE messages are accepted or rejected; SDP preconditions for any network element may change over time and embodiments can re-learn and respond to such preference changes accordingly.

Embodiments provide measures, including methods, apparatus, computer programs and computer program products, for use in providing session description SDP preconditions interworking. Such measures may be performed by a node responsible for providing SDP preconditions interworking in network 100, i.e. a SDP preconditions interworking node (for example network node 104).

The SDP preconditions interworking node receives a SIP message directed towards a downstream network element (for example downstream network element 106). The received message comprises SDP data. The SDP preconditions interworking node forwards the received SIP message on to the downstream network element with no modifications.

In response to forwarding the received SIP message, the SDP preconditions interworking node receives a rejection message from the downstream network element.

In response to the received rejection message indicating that the rejection message was transmitted due to the forwarded SIP message comprising no SDP preconditions, the SDP preconditions interworking node generates a second SIP message comprising one or more SDP preconditions and transmits the generated second SIP message to the downstream network element.

In response to the received rejection message indicating that the rejection message was transmitted due to the forwarded SIP message comprising one or more SDP preconditions, the SDP preconditions interworking node generates a third SIP message comprising no SDP preconditions and transmits the generated third SIP message to the downstream network element.

In embodiments, network node 104 comprises a processor or processing system, as depicted by element 104A in FIG. 1. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by network node 104. In embodiments, network node 104 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

In embodiments, network node 104 implements a weighted probability (for example takes the 'average' behavior over the last N received SIP messages) to take account of the fact that a single adjacency may be used to route to multiple endpoints with a variety of behaviors. In some such embodiments, network node 104 selects what it thinks is the 'most likely' type of SIP message to succeed, not just the behavior of the last SIP message sent.

Embodiments assist in reducing and/or minimizing the number of retries, by increasing and/or maximizing the probability of the downstream network element accepting any given message.

Embodiments may employ other methods of 'learning' SDP precondition preferences for downstream network elements, for example learning algorithms using different probabilities based on other parameters of SIP messages, not just an outbound adjacency, or doing a more complex weighting of past results. In embodiments, learning is configured on a per-adjacency basis, for example an operator may manually configure that a given adjacency has a given behavior, and this does not change.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

What is claimed is:

1. A method of processing session initiation protocol (SIP) messages at a network node located on a logical border between a first network and a second network, the method comprising, at the network node:

receiving, from an upstream network element which is located in the first network and which is logically adjacent the network node, a session initiation protocol (SIP) message directed towards a downstream network element which is located in the second network and which is logically adjacent the network node, wherein the received message comprises session description protocol (SDP) data indicating a first SDP preconditions setting;

forwarding the received SIP message on to the downstream network element in the second network with no modifications;

in response to forwarding the received SIP message, receiving a rejection message from the downstream network element in the second network;

on the basis of the received rejection message, determining that the first SDP preconditions setting is not supported by the downstream network element in the second network;

generating a second SIP message comprising SDP data indicating a second SDP preconditions setting different from the first SDP preconditions setting; and transmitting the generated second SIP message comprising SDP data indicating the second SDP preconditions setting to the downstream network element in the second network.

2. The method according to claim 1, wherein the first SDP preconditions setting comprises one or more SDP preconditions and the second SDP preconditions setting comprises no SDP preconditions.

3. The method according to claim 1, wherein the first SDP preconditions setting comprises no SDP preconditions and the second SDP preconditions setting comprises one or more SDP preconditions.

4. An apparatus for use in processing session initiation protocol (SIP) messages, the apparatus comprising:

at least one memory including computer program code; and at least one processor in data communication with the at least one memory, wherein the at least one processor is configured to, at a network node located on a logical border between a first network and a second network:

receive, from an upstream network element which is located in the first network and which is logically adjacent the network node, a session initiation protocol (SIP) message directed towards a downstream network element which is located in the second network and which is logically adjacent the network node, wherein the received message comprises session description protocol (SDP) data indicating a first SDP preconditions setting;

forward the received SIP message on to the downstream network element in the second network with no modifications;

in response to forwarding the received SIP message, receive a rejection message from the downstream network element in the second network;

on the basis of the received rejection message, determine that the first SDP preconditions setting is not supported by the downstream network element in the second network;

generate a second SIP message comprising SDP data indicating a second SDP preconditions setting different from the first SDP preconditions setting; and transmit the generated second SIP message comprising SDP data indicating the second SDP preconditions setting to the downstream network element in the second network.

5. A non-transitory computer-readable storage medium comprising computer-executable instructions which, when executed by a processor, cause a computerised device to perform a method of processing session initiation protocol (SIP) messages at a network node located on a logical border between a first network and a second network, the method comprising, at the network node:

receiving, from an upstream network element which is located in the first network and which is logically adjacent the network node, a session initiation protocol (SIP) message directed towards a downstream network element which is located in the second network and which is logically adjacent the network node, wherein the received message comprises session description protocol (SDP) data indicating a first SDP preconditions setting;

forwarding the received SIP message on to the downstream network element in the second network with no modifications;

in response to forwarding the received SIP message, receiving a rejection message from the downstream network element in the second network;

on the basis of the received rejection message, determining that the first SDP preconditions setting is not supported by the downstream network element in the second network;

generating a second SIP message comprising SDP data indicating a second SDP preconditions setting different from the first SDP preconditions setting; and transmitting the generated second SIP message comprising SDP data indicating the second SDP preconditions setting to the downstream network element in the second network.

* * * * *